United States Patent
Schraudolf et al.

(10) Patent No.: US 7,946,164 B2
(45) Date of Patent: May 24, 2011

(54) MEASUREMENT MACHINE FOR THE UNIFORMITY OF VEHICLE TIRES

(75) Inventors: Siegfried Schraudolf, Bickenbach (DE); Andreas Motzkus, Oppenheim (DE); Erwin Neumann, Gross-Gerau (DE)

(73) Assignee: Inmess Productions GmbH, Bremen (DE)

( * ) Notice: Subject to any disclaimer, the term of this patent is extended or adjusted under 35 U.S.C. 154(b) by 9 days.

(21) Appl. No.: 12/377,214

(22) PCT Filed: Aug. 8, 2007

(86) PCT No.: PCT/EP2007/007016
§ 371 (c)(1),
(2), (4) Date: Feb. 11, 2009

(87) PCT Pub. No.: WO2008/022711
PCT Pub. Date: Feb. 28, 2008

(65) Prior Publication Data
US 2010/0064789 A1    Mar. 18, 2010

(30) Foreign Application Priority Data
Aug. 19, 2006  (DE) .................. 10 2006 038 733

(51) Int. Cl.
*G01M 17/02* (2006.01)
*B24B 1/00* (2006.01)
(52) U.S. Cl. ........................................ 73/146
(58) Field of Classification Search ............ None
See application file for complete search history.

(56) References Cited

U.S. PATENT DOCUMENTS

| | | | | |
|---|---|---|---|---|
| 4,016,020 A | * | 4/1977 | Ongaro ............... | 156/75 |
| 4,173,850 A | * | 11/1979 | Gormish et al. ........ | 451/28 |
| 4,458,526 A | * | 7/1984 | Doi et al. ............ | 73/146 |
| 4,936,054 A | * | 6/1990 | Rogers et al. ......... | 451/51 |
| 5,027,649 A | * | 7/1991 | Himmler ............. | 73/146 |
| 5,309,377 A | * | 5/1994 | Beebe ............... | 702/105 |
| 2002/0014301 A1 | * | 2/2002 | Ogawa .............. | 156/117 |
| 2002/0124650 A1 | * | 9/2002 | Matsumoto ........... | 73/460 |
| 2002/0177964 A1 | * | 11/2002 | Shteinhauz ........... | 702/75 |

FOREIGN PATENT DOCUMENTS

| | | |
|---|---|---|
| DE | 2401279 A1 | 8/1974 |
| DE | 2715111 A1 | 10/1978 |
| DE | 3231852 A1 | 3/1984 |
| DE | 10138846 A1 | 3/2003 |
| WO | 8803866 A | 6/1988 |

OTHER PUBLICATIONS

International Search Report for corresponding International Application PCT/EP2007/007016.

* cited by examiner

*Primary Examiner* — Andre J Allen
(74) *Attorney, Agent, or Firm* — WRB-IP LLP

(57) ABSTRACT

A measurement machine for uniformity serves for determining radial and lateral force fluctuations of vehicle tires (4), which are received by a drivable support spindle (2) supported on a machine frame (1). The vehicle tire (4) rotates on a rotatable revolving drum supported on the machine frame (1) via force measurement elements (8). The rotational axis of the support shaft (2) is disposed horizontally. The rotational axis of the revolving drum (5) is disposed horizontally in a vertical plane containing the rotational axis of the support shaft (2) beneath the support spindle (2). The revolving drum (5) is supported in a revolving drum carriage (9) vertically adjustable in the machine frame (1). The revolving drum (5) has a drum shaft (6), the two drum shaft bearings (7) of which are each supported via one of the force measurement elements (8) on the revolving drum carriage (9).

6 Claims, 4 Drawing Sheets

MEASUREMENT MACHINE FOR THE UNIFORMITY OF VEHICLE TIRES

The invention concerns a measurement machine for uniformity for determining radial and lateral force fluctuations of vehicle tires which are housed on a drivable support spindle mounted in a machine frame, and rotate on a rotatable revolving drum which is mounted over a force measurement element on the machine frame.

Increasingly higher demands are placed on the smooth running of vehicle tires. The need then arises to test the operational uniformity of vehicle tires and to measure the radial force and lateral force fluctuations between the vehicle tires and the revolving drum. Besides the measuring of force fluctuations which arise when wheels rotate, an important function of this measurement machine for uniformity consists in determining the cone force and the so-called ply steer from the static lateral forces. In this context, "static forces" will mean the average value of forces resulting from one rotation.

With known measurement machines for uniformity, the drivable support spindle holding the test rims and the revolving drum are disposed side by side, each with a vertical rotational axis. The space required for this measurement machine is therefore relatively great.

Only force fluctuations are measured in the radial direction of the vehicle tire. In contrast, in the lateral direction the static portion is also measured for the calculation of the test results. Consequently, an initial load in the radial direction is not recorded directly as a disturbance in the test results. With a vertical suspension, the weight force is recorded directly as a disturbance when measuring lateral forces. This is a major source of error, particularly with ground vibrations, such as when, for instance, a forklift drives past, because the measurement of the fluctuations and disturbances due to the inertial forces of the revolving drum can shift on the same scale.

The drawbacks of the known vertical suspension will be clear if one considers the ratios of weight and forces. The weight of a load wheel and mounting usually amounts to about 50-60 kg. The static lateral forces usually amount to 300-400 N, in modern wide-base tires 600-800 N. The measuring range of the machine in the lateral direction is usually 1000 N. The contact force usually lies in the range of 4000 N-6000 N. The contact pressure must usually be adjustable up to 10,000 N. The fluctuations in the lateral direction are usually about 20 N and in the radial direction about 130 N.

With vertical mounting of the tire to be tested, a weight force of about 600 N appears which directly interferes with the measured lateral forces. Thereby the disturbance variable is almost exactly as great as the measured quantity. This means that one must choose a measurement range for the force sensor twice as large as is actually necessary. In doing so, the resolution and measurement precision diminishes by 100%. The forces in the radial direction are unipolar. The revolving drum is weighted only by compressive forces; no tensile forces can arise. Lateral forces change sign with the direction of rotation. Hysteresis effects can influence measurements much more here than with radial measurements. Possible errors accrue through mechanical loss.

Many force sensors have nonlinearities near the zero-crossing point. With a vertical suspension of the load wheel, it is therefore a drawback to embed the spindle in the force sensor so that the load wheel stands in its idle state with its full weight on the lower load cell and moves force-free so to speak on the upper load cell.

The usual approach consists in supporting half of the weight force of the load wheel in the upper load cell and half in the lower load cell. For this, the upper load cell is moved upwards by means of a mechanical adjusting device until half of the weight force is affected. The load wheel therefore half "stands" and half "hangs."

With this, there are the following drawbacks: a) The load cells are already preloaded in the idle state on the scale of the force to be measured, which means a measuring range must be chosen which is twice as large. This leads to lower resolution and lesser measurement precision. In addition, the cost of the load cells is higher.

b) In practice, the use of an adjusting device for the input tension has problems. The adjustment is difficult. The axis of the load wheel must be absolutely parallel with the axis of the wheel if one wants to measure conicity. The adjusting device causes additional loss in the mechanical assembly and hampers parallel alignment.

A task of the invention is therefore to construct a measuring machine for uniformity of the sort mentioned at the beginning that requires little space, but achieves a high level of measurement accuracy, particularly for the lateral forces. In this way, the drawbacks described above can be resolved.

This task is achieved according to the invention in that the rotational axis of the support spindle is disposed horizontally, the rotational axis of the revolving drum is disposed horizontally in a vertical plane holding the rotational axis of the support spindle, and the revolving drum is mounted in a revolving drum carriage which is vertically adjustable in the machine frame.

By disposing the vehicle tire to be tested over the revolving drum, one achieves a design for a measuring machine that requires little space. The drawbacks previously described are eliminated by means of a vertical mounting suspension of the load wheel. With a horizontal disposition of the revolving drum, the weight force only affects the radial direction. There the measuring range is 10,000 N, and therefore the ratio of disturbance to measurement lies at about 10,000 to 600=6%. This even lies in the useable overload range of most force sensors.

The use of a mechanical adjusting device for the spindle of the load wheel can be dispensed with, so that no input tension of the load cell results. Therefore it is not necessary to choose a measurement range of the load cell larger than needed for the measurement. In this way one obtains higher resolution and accuracy of the force measurement.

According to a preferred embodiment of the invention, it is provided that each force measurement element has a force sensor frame resting on the revolving drum, which is positioned over at least two horizontal suspension links, which are vertically flexible and support extension measurement elements, and which are connected to at least one intermediate field, and [it is provided] that the intermediate field, which is positioned over a vertical suspension link supporting an extension measurement element which is flexible in the direction of the rotational axis of the revolving drum, is connected to a base plate attached to a revolving drum carriage.

In contrast to conventional load cells this embodiment of the force measurement element yields a compact, highly resilient embodiment with higher measuring sensitivity. The suspension links provided on the force measurement elements take over the conduct of the revolving drum storages in the respective measurement directions with very low space requirements and high load capacity. The measurement means needed for this are extremely minimal, so that the position and axis alignment of the revolving drum are not adversely affected by the measurement motions.

Further favorable embodiments of the invention are the subject of other subclaims.

The invention is illustrated below in an example of an embodiment, which is depicted in the illustration as follows.

Figure 1:
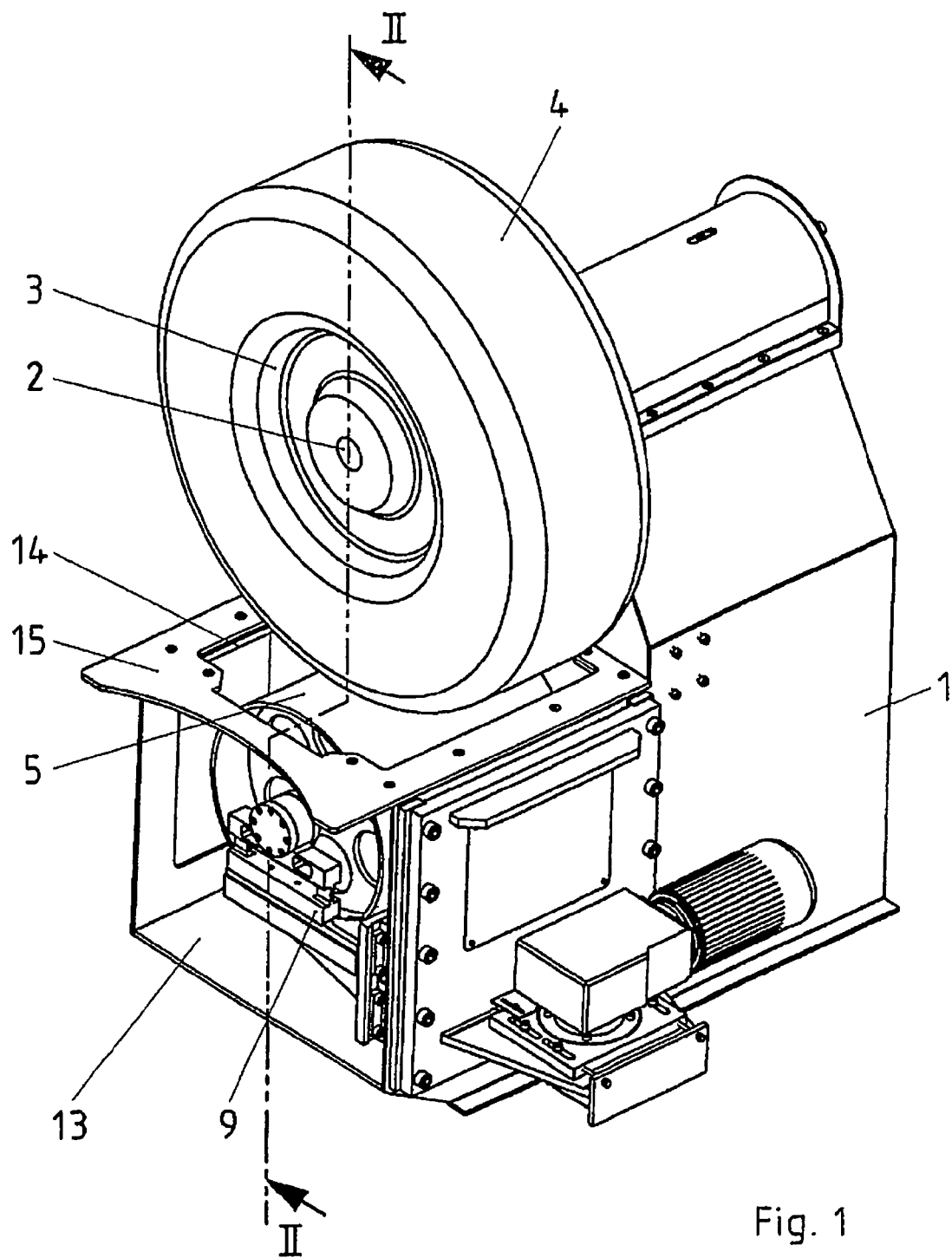
FIG. 1 shows a measurement machine for uniformity for vehicle tires in spatial representation, whereby parts of the machine casing are left out.
Figure 2:
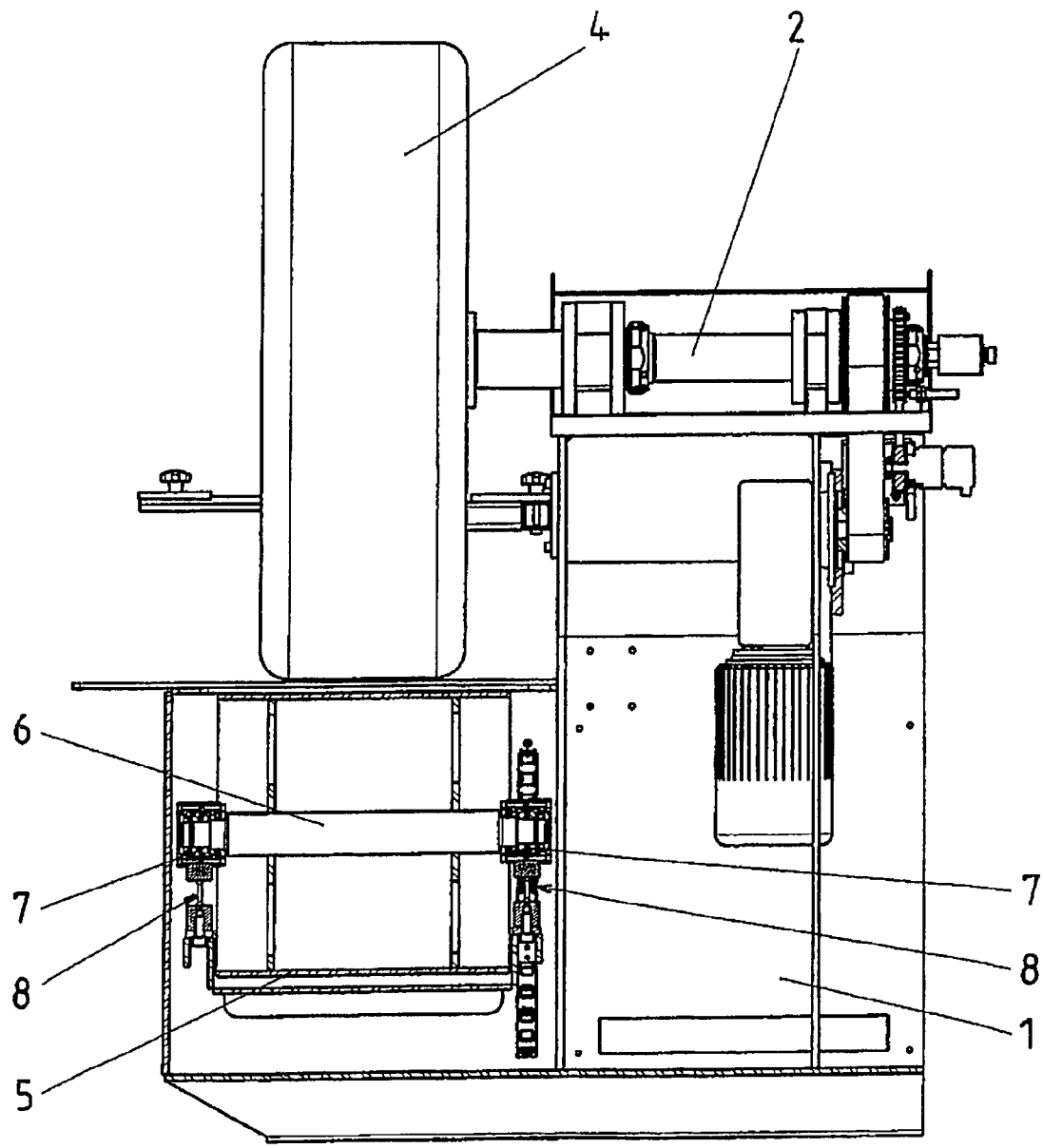
FIG. 2 shows a vertical section along line II-II in FIG. 1.
Figure 3:
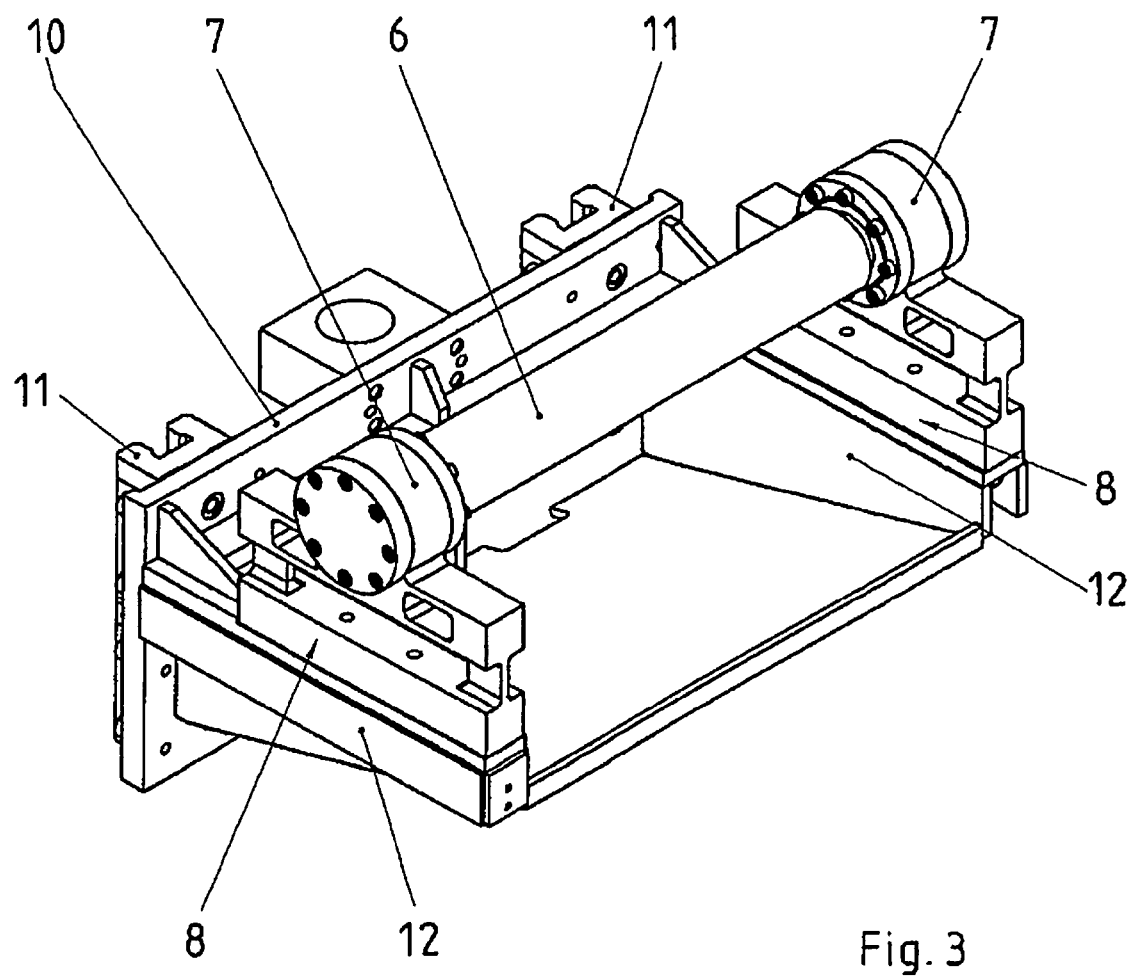
FIG. 3 shows an enlarged partial spatial representation of the revolving drum carriage supporting the revolving drum axis.

The measurement machine for uniformity depicted in FIGS. 1-3 serves for the determination of radial and lateral force fluctuations in vehicle tires. It contains a machine frame 1, in which a drivable horizontal support spindle 2 is mounted and rotatable. On the support spindle 2, a vehicle tire 4 to be tested is mounted over a test rim 3. Alternately, a completely assembled vehicle wheel can also be mounted without the test rim 3.

A revolving drum 5 on which the cylindrical surfaces of the vehicle tires 4 rotate is parallel to the horizontal rotational axis and disposed under the rotational axis of the support spindle 2. The rotational axis of the revolving drum 5 and the rotational axis of the support spindle 2 thus lie together in a vertical plane which corresponds to the section plane II-II.

The revolving drum 5 has a drum shaft 6, both drum shaft bearings 7 of which are mounted over a force measurement element 8 in a revolving drum carriage 9. The revolving drum carriage 9 is vertically adjustable in the machine frame 1.

The revolving drum carriage 9 (FIG. 3) holds a vertical carriage plate 10, which is guided in vertical bedways 11 of the machine frame. From the carriage plate 10 protrude two cantilevers 12, each of which hold one of the two bearings 7 of the drum shaft 6 via the assigned force measurement element 8.

The revolving drum 5 is disposed with the revolving drum carriage 9, which supports it, in the housing 13 of the machine frame 1, which is depicted in FIG. 1 partially open, and protrudes, elevated, through a window 14 in a horizontal machine leaf 15 which encloses the housing 13 on the top.

Figure 4:
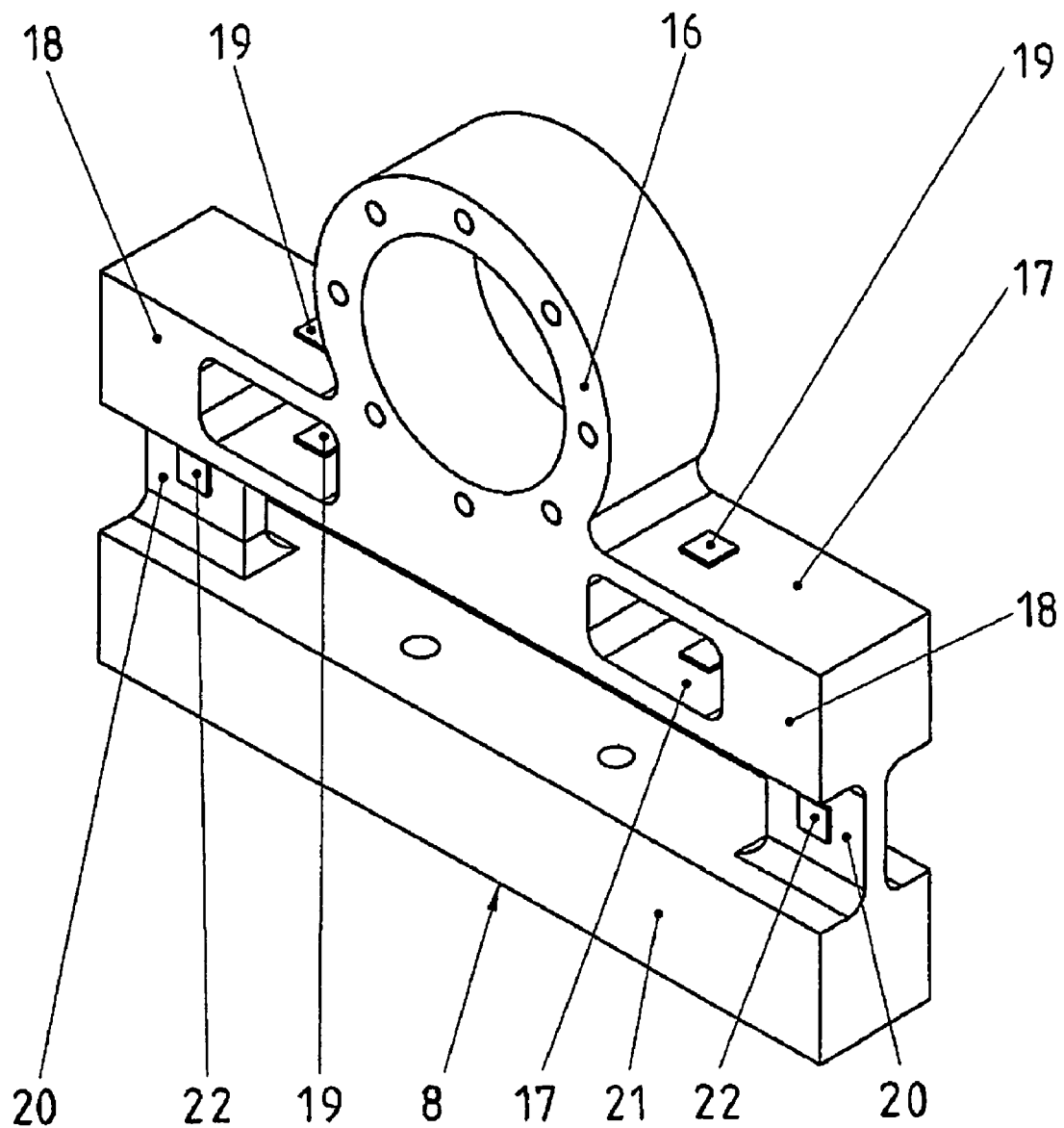
FIG. 4 shows in even more enlarged spatial representation, one of the two force measurement elements of the uniformity measurement machine according to FIGS. 1-3.

As is depicted in detail in FIG. 4, each of the two force measurement elements 8 has a force sensor frame resting on the mounting 7 of the revolving drum 5, each of which is connected on each side to an intermediate field 18 over two horizontal suspension links 17, which are disposed parallel to each other. The horizontal suspension links 17 are vertically flexible and support extension measurement elements 19, which are connected to an electrical measurement bridge (not depicted).

Each of the two intermediate fields 18 is connected via a vertical suspension link 20 to a common base 21 attached to the revolving drum carriage 9. The vertical suspension links 20, which are flexible in the direction of the rotational axis of the revolving drum 5 support extension measurement elements 22 which are connected to the electrical measurement bridge.

Fluctuations of the radial forces exercised by the rotating vehicle tires 4 on the revolving drum 5 lead to a deformation of the horizontal suspension links 17 and thereby to resistance in the extension measurement elements 19 which are acting as extension measurement gauges. These resistances are detected and analyzed in the electrical measurement bridge.

Fluctuations of the lateral forces exercised by the rotating vehicle tires 4 on the revolving drum 5 in the direction of the axis lead to deformations of the vertical suspension links 20 and thereby to resistances in the extension measurement elements 22 which are acting as extension measurement gauges. These resistances are also analyzed in the electrical measurement bridge.

The invention claimed is:

1. Measurement machine for uniformity for determining radial and lateral force fluctuations in vehicle tires which are received by a drivable support spindle mounted on a frame of the machine and rotate on a rotatable revolving drum supported on the machine frame via force measurement elements, wherein a rotational axis of the support spindle is disposed horizontally, the rotational axis of the revolving drum is disposed horizontally in a vertical plane beneath the support spindle, the vertical plane containing the rotational axis of the support spindle, and the revolving drum is supported in a revolving drum carriage vertically adjustable in the machine frame, wherein the revolving drum comprises a drum shaft and two drum shaft bearings of the drum shaft are each supported via one of the force measurement elements on the revolving drum carriage, and wherein the revolving drum carriage comprises a vertical carriage plate which is guided in vertical bedways on the machine frame and wherein, from the vertical carriage plate, two cantilevers protrude, each cantilever holding a bearing of the drum shaft via a force measurement element.

2. Measurement machine for uniformity according to claim 1, wherein each force measurement element comprises a force sensor frame supported on the revolving drum, the force sensor frame being connected via at least two horizontal, vertically adjustable, suspension links holding extension measurement elements to at least one intermediate field, and wherein the intermediate field is connected to a base plate, the base plate being attached to the revolving drum carriage via a vertical suspension link supporting extension measurement element, the vertical suspension link supporting extension measurement element being adjustable in a direction of a rotational axis of the revolving drum.

3. Measurement machine for uniformity according to claim 2, wherein the force sensor frame is connected to an intermediate field on either side thereof via two horizontal suspension links disposed parallel to each other, and each of the two intermediate fields is connected to a common base plate via a vertical suspension link.

4. Measurement machine for uniformity according to claim 1, wherein the revolving drum carriage comprises a vertical carriage plate which is guided in vertical bedways on the machine frame and wherein, from the vertical carriage plate, two cantilevers protrude, each cantilever holding a bearing of the drum shaft via a force measurement element.

5. Measurement machine for uniformity according to claim 1, wherein the two cantilevers protrude substantially horizontally from a vertically oriented surface of the vertical carriage plate.

6. Measurement machine for uniformity according to claim 1, wherein the vertical carriage plate is a single plate from which both of the two cantilevers protrude.

* * * * *